(12) United States Patent
Mcgowan

(10) Patent No.: US 8,510,759 B1
(45) Date of Patent: Aug. 13, 2013

(54) SCATTER GATHER EMULATION

(75) Inventor: Steven Mcgowan, Portland, OR (US)

(73) Assignee: Intel Corporation, Santa Clara, CA (US)

(\*) Notice: Subject to any disclaimer, the term of this patent is extended or adjusted under 35 U.S.C. 154(b) by 0 days.

(21) Appl. No.: 13/537,121

(22) Filed: Jun. 29, 2012

(51) Int. Cl.
*G06F 13/00* (2006.01)

(52) U.S. Cl.
USPC ............ 719/321; 709/231; 711/202; 711/203

(58) Field of Classification Search
USPC .................. 719/321; 709/231; 711/202, 203
See application file for complete search history.

(56) References Cited

U.S. PATENT DOCUMENTS

| | | | |
|---|---|---|---|
| 7,577,707 B2 * | 8/2009 | Hufferd et al. | 709/206 |
| 7,856,026 B1 * | 12/2010 | Finan et al. | 370/412 |
| 2004/0210584 A1 * | 10/2004 | Nir et al. | 707/10 |

\* cited by examiner

*Primary Examiner* — Andy Ho
(74) *Attorney, Agent, or Firm* — Jordan IP Law, LLC

(57) ABSTRACT

Systems and methods may provide for receiving a scatter/gather list that identifies a contiguous data block in a physical memory, and splitting the contiguous data block into a first data packet payload and a second data packet payload based on a target packet size. Additionally, another contiguous data block can be combined into one of the first and second data packet payloads based on the target packet size, wherein the first and second data packet payloads may be transferred in a data stream through a host interface that does not support scatter/gather lists. In one example, a software driver is used to split and combine the contiguous data blocks.

30 Claims, 2 Drawing Sheets

SCATTER GATHER EMULATION

BACKGROUND

1. Technical Field

Embodiments generally relate to input/output (IO) interfaces. More particularly, embodiments relate to the use of software to emulate scatter/gather operation in IO interfaces.

2. Discussion

Computing systems may include one or more IO host interfaces, wherein the host interfaces can provide connectivity to peripheral devices such as displays. Moreover, IO applications on computing systems can use virtual memory blocks to transmit and receive data through host interfaces. For example, a "scatter/gather" list may map the virtual memory blocks to physical memory blocks, wherein data is scattered into the physical memory blocks specified in the list and gathered by the host interface from the physical memory blocks for transmission. Conventional host interfaces may therefore provide hardware support for logical addressing, transport reliability, and scatter/gather operation optimization.

If the host interface does not support scatter/gather lists, however, a buffering scheme might be deployed in which software copies the data from the physical memory blocks to intermediate buffers in order to support these functions (e.g., achieve data packet payloads of a particular size). The data copying operations of such a buffering scheme can have a negative impact on IO performance.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a computer readable storage medium having a set of instructions which, if executed by a processor, cause a computer to receive a scatter/gather list, wherein each entry in the scatter/gather list that identifies a contiguous data block in a physical memory. The instructions, if executed, can also cause a computer to split the contiguous data block into a first data packet payload and a second data packet payload based on a target packet size, and transfer the first and second data packet payloads in a data stream through a host interface that does not support scatter/gather lists.

Other embodiments may include a system having a physical memory, a host interface that does not support scatter/gather lists, and logic to receive a scatter/gather list that identifies a contiguous data block in the physical memory. The logic may also split the contiguous data block into a first data packet payload and a second data packet payload based on a target packet size, and transfer the first and second data packet payloads in a data stream through the host interface.

Additionally, embodiments can include a computer implemented method that involves receiving a scatter/gather list that identifies a plurality of contiguous data blocks in a physical memory, wherein the plurality of contiguous data blocks correspond to a virtual memory block, the scatter/gather list identifies a start address and size of each of the plurality of contiguous data blocks, and a start address of a first contiguous data block of the plurality of contiguous data blocks is not page aligned. The method may also provide for using a driver to incorporate the first contiguous data block into a first data packet payload based on a target packet size, and using the driver to split a second contiguous data block of the plurality of contiguous data blocks into the first data packet payload and a second data packet payload based on the target packet size. Moreover, the method can involve transferring the first and second data packet payloads in a data stream through a host interface that does not support scatter/gather lists.

Embodiments may also include a computer implemented method in which a scatter/gather list is received, wherein the scatter/gather list identifies a first contiguous data block and a second contiguous data block in a physical memory. Additionally, the method may provide for concatenating the first contiguous data block and the second contiguous data block into a first data packet payload based on a target packet size. The first data packet payload can be transferred in a data stream through a host interface that does not support scatter/gather lists.

Figure 1:
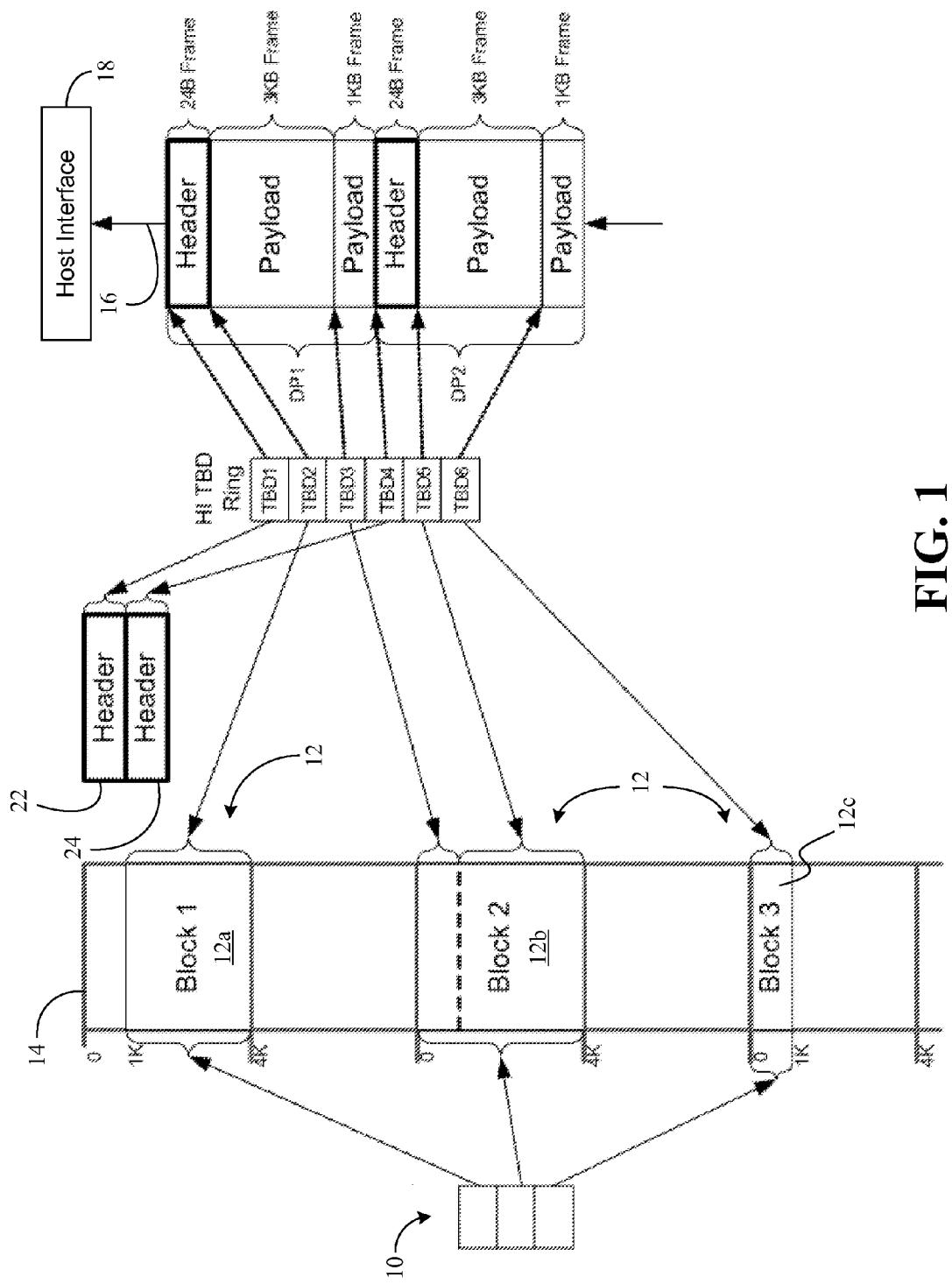
FIG. 1 is a block diagram of an example of a data transmission scheme according to an embodiment.

Turning now to FIG. 1, a data transmission scheme is shown in which each entry of a scatter/gather list 10 identifies a plurality of contiguous data blocks 12 (12*a*-12*c*) in a physical memory 14. The contiguous data blocks 12 may correspond to, for example, a virtual memory block that is used by an application executing on a computing system to perform one or more input/output (10) related functions, an individual data structure that is saved along with an associated 10 application, and so forth. In one example, the functions are associated with the output of information to a peripheral device such as a display (e.g., the visual presentation of information to a user).

The illustrated physical memory 14 is organized into pages (e.g., sized at 4 KB). The scatter/gather list 10 may identify a start address (e.g., offset into a page) and size of each of the plurality of contiguous data blocks 12, wherein the start address of a first contiguous data block 12*a* is not page aligned, in the example shown. As will be discussed in greater detail, the contiguous data blocks may be selectively split and/or combined (e.g., concatenated) in order to achieve a target packet size for data packets (DP1, DP2) as they are incorporated into a data stream 16 that is transferred through an IO host interface 18. In this regard, the target packet size may be defined by one or more headers 22, 24. In one example, each scatter/gather list 10 is treated as a separate "transfer", wherein all packets of a given transfer (except for possibly the last packet) are assigned a common maximum payload size in order to minimize overhead associated with sending headers and simply buffer allocation at the receive end. Of particular note is that the scatter/gather list 10 may be used to structure the data packets although the host interface 18 might not support scatter/gather lists.

For example, a software driver (not shown) may be used to incorporate the first contiguous data block 12*a* into the payload of a first data packet (DP1), wherein the driver may also split a second contiguous data block 12*b* into the payload of the DP1 data packet and the payload of a second data packet (DP2). More particularly, the driver may determine that the first contiguous data block 12*a* has a size of 3 KB (due its start address not being page aligned), which might be less than the target packet size (e.g., 4 KB). Accordingly, the driver can combine the first contiguous data block 12*a* with a first portion of the second contiguous data block 12*b* into the payload of the DP1 data packet. The DP1 data packet may therefore be constructed by using a set of transmit buffer descriptors (TBD1, TBD2, TBD3) to reference the header 22, the first contiguous data block 12a, and the first portion of the second contiguous data block 12b, respectively. The result is the DP1 data packet having the target packet size even though the host interface 18 may not support scatter/gather lists 10. Of particular note is that the illustrated approach represents a bufferless data transfer from the physical memory 14 to the host interface 18, wherein software copy operations of the data to an intermediate set of buffers are not involved.

The software driver may also determine that the size of the remaining portion of the second contiguous data block 12b is less than the target packet size, and therefore combine the remaining portion of the second contiguous data block 12b with a third contiguous data block 12c into the payload of the DP2 packet. The DP2 data packet may therefore be constructed by using another set of transmit buffer descriptors (TBD4, TBD5, TBD6) to reference the header 24, the second portion of the second contiguous data block 12b, and the third contiguous data block 12c, respectively. Thus, the second contiguous data block 12b is split into the payload of the DP1 data packet and the payload of the DP2 data packet, wherein the DP2 data packet also has the target packet size, in the example shown. From the information in each packet header 22, 24, the receiving end (not shown) can count the packet payloads received and generate an error (e.g., overrun) if either the maximum payload size or number of packet payloads specified in the header are exceeded. Again, the illustrated data transfer is bufferless in the sense that software copy operations of the data to an intermediate set of buffers are not involved. The illustrated approach may therefore be more efficient than conventional approaches and can substantially enhance 10 performance.

Figure 2:
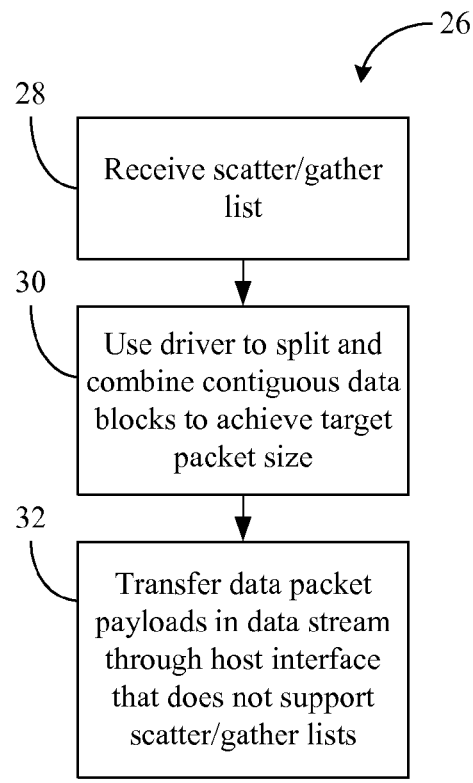
FIG. 2 is a flowchart of an example of a method of transmitting data according to an embodiment.

FIG. 2 shows a method 26 of transmitting data. The method 26 may be implemented as a set of driver logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 26 may be written in any combination of one or more programming languages, including an object oriented programming language such as Java, Smalltalk, C++ or the like and conventional procedural programming languages, such as the "C" programming language or similar programming languages.

Illustrated processing block 28 provides for receiving a scatter/gather list that identifies one or more contiguous data blocks in a physical memory. A driver may be used at block 30 to split at least one of the contiguous data blocks to achieve a target packet size. Block 30 may also provide for combining two or more of the contiguous data blocks to achieve the target packet size. Data packet payloads can be transferred at block 32 in a data stream through a host interface that does not support scatter/gather lists. The data transfer from the physical memory to the host interface may be bufferless, as already discussed.

Figure 3:
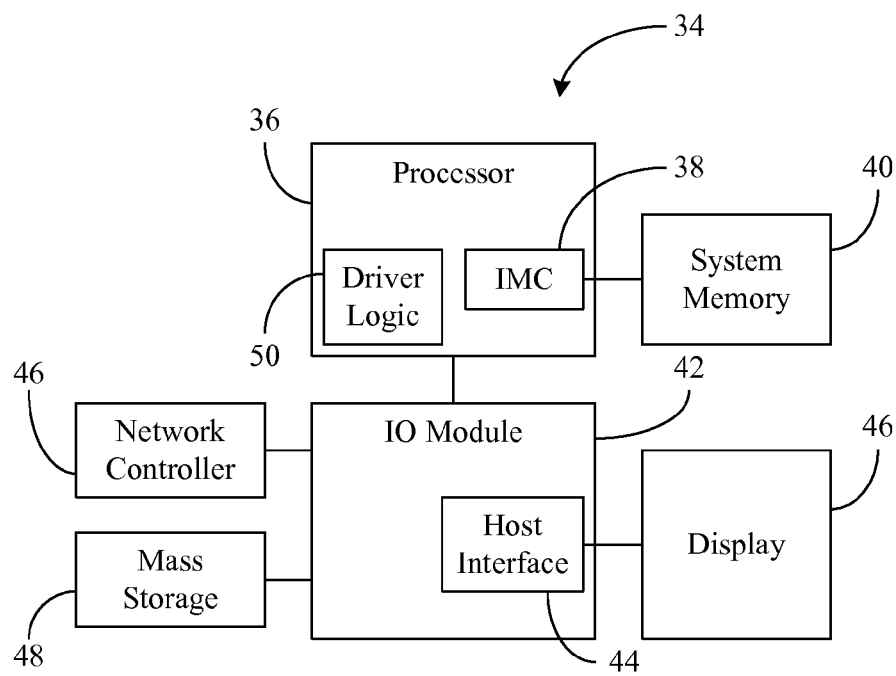
FIG. 3 is a block diagram of an example of a computing system according to an embodiment.

Turning now to FIG. 3 a computing system 34 is shown, wherein the system 34 may be part of a device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, a processor 36 has an integrated memory controller (IMC) 38 that facilitates communication between the processor 36 and system memory 40, wherein the system memory 40 could include, for example, double data rate (DDR) synchronous dynamic random access memory (SDRAM, e.g., DDR3 SDRAM JEDEC Standard JESD79-3C, April 2008) modules. The modules of the system memory 40 may be incorporated into a single inline memory module (SIMM), dual inline memory module (DIMM), small outline DIMM (SODIMM), and so forth. Thus, the system memory 40 could be used for the physical memory 14 (FIG. 1), already discussed.

The illustrated system 34 also includes an IO module 42 having a host interface 44, which might be a Thunderbolt interface (e.g., Thunderbolt™ Technology: The Transformational PC I/O, 2011, Intel Corporation) that facilitates communication with a peripheral or embedded device such as a display 46. Thus, the host interface 44 could be readily substituted for the aforementioned host interface 18 (FIG. 1). The IO module 42 can also be coupled to a network controller 46, mass storage 48, and various other controllers, busses and/or modules. As already noted, the host interface 44 may not support scatter/gather lists, wherein the processor 36 executes driver logic 50 that supports logical addressing, enables reliable data transport, and optimizes scatter/gather operations. Thus, any retransmissions due to errors, logical data flow addressing of data packets, or data flow control operations may be handled by the driver logic 50. The driver logic 50 may therefore emulate hardware scatter/gather support by enabling the host interface 44 to conduct direct memory access (DMA) transfers from the pages of a virtual memory buffer.

More particularly, the driver logic 50 may be configured to receive a scatter/gather list that identifies a contiguous data block in the system memory 40 and split the contiguous data block into a first data packet payload and a second data packet payload based on a target packet size. In one example, the driver logic 50 also combines another contiguous data block into one of the first and second data packet payloads based on the target packet size. The driver logic 50 may also transfer the first and second data packet payloads in a data stream through the host interface 44.

Techniques described herein may therefore enable reliable and efficient 10 data transfer in architectures having host interfaces that do not support scatter/gather operations. A reduction in processor and memory cycle consumption may also translate into reduced power consumption and extended battery life in mobile devices.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer implemented method comprising:
receiving a scatter/gather list that identifies a plurality of contiguous data blocks in a physical memory, wherein the plurality of contiguous data blocks correspond to one or more of a virtual memory block and an application data structure, each entry in the scatter/gather list identifies a start address and size of each of the plurality of contiguous data blocks, and a start address of a first contiguous data block of the plurality of contiguous data blocks is not page aligned;
using a driver to incorporate the first contiguous data block into a first data packet payload based on a target packet size defined by a packet header associated with the scatter/gather list;
using a driver to split a second contiguous data block of the plurality of contiguous data blocks into the first data packet payload and a second data packet payload based on the target packet size; and
transferring the first and second data packet payloads in a data stream through a host interface that does not support scatter/gather lists.

2. The method of claim 1, wherein splitting the second contiguous data block includes:
using a first transmit buffer descriptor to reference a first portion of the second contiguous data block in the physical memory; and
using a second transmit buffer descriptor to reference a second portion of the second contiguous data block in the physical memory.

3. The method of claim 1, wherein transferring the first and second data packet payloads includes conducting a bufferless data transfer from the physical memory to the host interface.

4. The method of claim 1, wherein the data stream is transferred through a Thunderbolt interface.

5. A system comprising:
a physical memory;
a host interface that does not support scatter/gather lists; and
logic to,
receive a scatter/gather list that identifies a contiguous data block in the physical memory,
split the contiguous data block into a first data packet payload and a second data packet payload based on a target packet size, and
transfer the first and second data packet payloads in a data stream through the host interface.

6. The system of claim 5, wherein the logic is to combine another contiguous data block into one of the first and second data packet payloads based on the target packet size.

7. The system of claim 5, wherein the logic is to,
use a first transmit buffer descriptor to reference a first portion of the contiguous data block in the physical memory, and
use a second transmit buffer descriptor to reference a second portion of the contiguous data block in the physical memory.

8. The system of claim 5, wherein the logic is to conduct a bufferless data transfer of the first and second data packet payloads from the physical memory to the host interface.

9. The system of claim 5, wherein the host interface includes a Thunderbolt interface.

10. The system of claim 5, wherein the logic includes driver logic.

11. The system of claim 5, wherein the scatter/gather list is to identify a plurality of contiguous data blocks in the physical memory, and wherein the plurality of contiguous data blocks are to correspond to one or more of a virtual memory block and an application data structure.

12. The system of claim 11, wherein the scatter/gather list is to identify a start address and size of each of the plurality of contiguous data blocks, and wherein a start address of a first of the plurality of contiguous data blocks is not page aligned.

13. The system of claim 11, wherein the target packet size is to be defined by a packet header associated with the scatter/gather list.

14. A computer readable storage medium comprising a set of instructions which, if executed by a processor, cause a computer to:
receive a scatter/gather list that identifies a contiguous data block in a physical memory;
split the contiguous data block into a first data packet payload and a second data packet payload based on a target packet size; and transfer the first and second data packet payloads in a data stream through a host interface that does not support scatter/gather lists.

15. The medium of claim 14, wherein the instructions, if executed, cause a computer to combine another contiguous data block into one of the first and second data packet payloads based on the target packet size.

16. The medium of claim 14, wherein the instructions, if executed, cause a computer to:
use a first transmit buffer descriptor to reference a first portion of the contiguous data block in the physical memory; and
use a second transmit buffer descriptor to reference a second portion of the contiguous data block in the physical memory.

17. The medium of claim 14, wherein the instructions, if executed, cause a computer to conduct a bufferless data transfer of the first and second data packet payloads from the physical memory to the host interface.

18. The medium of claim 14, wherein the data stream is to be transferred through a Thunderbolt interface.

19. The medium of claim 14, wherein the instructions include driver instructions.

20. The medium of claim 14, wherein the scatter/gather list is to identify a plurality of contiguous data blocks in the physical memory, and wherein the plurality of contiguous data blocks are to correspond to one or more of a virtual memory block and an application data structure.

21. The medium of claim 20, wherein the scatter gather list is to identify a start address and size of each of the plurality of contiguous data blocks, and wherein a start address of a first of the plurality of contiguous data blocks is not page aligned.

22. The medium of claim 20, wherein the target packet size is to be defined by a packet header associated with the scatter/gather list.

23. A computer implemented method comprising:
receiving a scatter/gather list that identifies a first contiguous data block and a second contiguous data block in a physical memory;
concatenating the first contiguous data block and the second contiguous data block into a first data packet payload based on a target packet size; and
transferring the first data packet payload in a data stream through a host interface that does not support scatter/gather lists.

24. The method of claim 23, wherein the scatter/gather list identifies a third contiguous data block in the physical memory and the method further includes splitting the third contiguous data block into the first data packet payload and a second data packet payload based on the target packet size.

25. The method of claim 23, wherein combining the first contiguous data block and the second contiguous data block includes:
using a first transmit buffer descriptor to reference the first contiguous data block in the physical memory; and
using a second transmit buffer descriptor to reference at least a portion of the second contiguous data block in the physical memory.

26. The method of claim 23, wherein transferring the first data packet payload includes conducting a bufferless data transfer from the physical memory to the host interface, and wherein the data stream is transferred through a Thunderbolt interface.

27. The method of claim 23, wherein a driver is used to combine the first and second contiguous data blocks.

28. The method of claim 23, wherein the first and second contiguous data blocks correspond to one or more of a virtual memory block and an application data structure.

29. The method of claim 23, wherein the scatter/gather list identifies a start address and size of the first and second contiguous data blocks, and wherein a start address of the first contiguous data block is not page aligned.

30. The method of claim 23, wherein the target packet size is defined by a packet header associated with the scatter/gather list.

\* \* \* \* \*